United States Patent
Sanderson et al.

[11] Patent Number: 5,287,892
[45] Date of Patent: Feb. 22, 1994

[54] INSULATING PLUG

[76] Inventors: Laddy P. Sanderson; Gordon B. Sanderson, both of 718 Cedar Bayou Rd., Baytown, Tex. 77520

[21] Appl. No.: 34,497
[22] Filed: Mar. 19, 1993
[51] Int. Cl.⁵ ............................................. F16L 55/16
[52] U.S. Cl. ...................................... 138/92; 138/89; 138/90; 138/149
[58] Field of Search ...................... 138/89, 92, 94, 149, 138/90; 220/213, 215; 73/49.1

[56] References Cited

U.S. PATENT DOCUMENTS

| | | | |
|---|---|---|---|
| 5,747 | 1/1874 | Kutscher | 138/89 |
| 791,351 | 5/1905 | Malloy | 138/89 |
| 899,291 | 9/1908 | Brown | 138/90 |
| 2,209,580 | 7/1940 | Sargent | 138/92 |
| 2,604,225 | 7/1952 | Armstrong | 138/90 |
| 2,737,205 | 3/1956 | Stringfield | 138/89 |
| 3,658,096 | 4/1972 | Higuera | 138/90 |
| 3,827,462 | 8/1974 | Celesta | 138/90 |
| 4,091,842 | 5/1978 | Greenawalt et al. | 138/90 |
| 4,262,701 | 4/1981 | Beacom | 138/89 |
| 5,010,926 | 4/1991 | Kurth et al. | 138/149 |
| 5,014,866 | 5/1991 | Moore | 215/364 |

*Primary Examiner*—James E. Bryant, III
*Attorney, Agent, or Firm*—Matthews & Associates

[57] ABSTRACT

A compact, easily used, high quality sealing plug for use with ultrasonic testing equipment which incorporates a single annular body with an indented diaphragm portion, two lips, an annular vertical wall extending upwardly from said indented diaphragm portion of said single circular body with two annular lips extending outwardly therefrom, one at the upper end of said annular wall and the other therebelow so that when said seal is in use, the upper lip will maintain a position above the insulation material in which the seal is placed, while the lower lip will be below said outermost surface, both lips counteracting each other to maintain tension therebetween and the present invention from becoming unintentionally dislodged from its location. Alternative embodiments of the present invention are also disclosed which include alternative lip arrangements for alternative sealing needs and desires. A handle is mounted to the uppermost portion of said seal to allow for removal and reinsertion into the insulation material being plugged. Insulation material is also affixed to the lower end of said annular body immediately below said indented diaphragm portion so as to maintain an insulation covering over the area which has been exposed for an electronic testing or the like.

15 Claims, 2 Drawing Sheets

INSULATING PLUG

BACKGROUND OF THE INVENTION

I. Field of the Invention

In various types of high and low temperature arrangements used in chemical plants, refineries and similar types of industrial locations, a multitude of pipes, tanks and related equipment must be used as storage and conduit systems for the material or materials utilized in the various processes employed at the various locations mentioned. Often this equipment must carry and store fluids that range from cryogenic temperatures to 1400 degrees fahrenheit and which may also be caustic or corrosive in nature. Due to the nature of these fluids or gases, the equipment within which they are transported and stored must deploy various types of configurations of insulating material such as preformed links of insulation defining half cylinders which are clamped around the pipes, molded insulation formed or applied directly on or to the pipes or strips of insulation wrapped around the pipes. In order to ensure the integrity of the transportation and storage equipment such as pipes and vessels, periodic checks are necessary so as to determine whether or not there has been corrosion on the interior or exterior of the piping or equipment. Periodic checks of the thickness of the material also permit maintenance personnel to schedule replacement activities so that the unanticipated shut down of a system can be avoided. Of the methods used to determine and check structural integrity of the vessels and piping, a preferred procedure is to utilize ultrasonic testing equipment which will provide indication of the pipe or vessel wall thickness These types of devices utilize ultrasonic transducers which must be maintained in direct contact with the metal wall of the pipe or vessel subject to testing in order to make the appropriate measurements of thickness. Since, as noted above, the equipment which is being tested is normally insulated the insulating material must be removed in order for the test to be properly conducted. The presence of the insulating prevents such test activity. Following testing it is necessary to replace the insulation in order to maintain the insulation integrity of the system and avoid possible heat loss, gain and/or injury to workers.

In light of the need to have direct contact with the various pieces of equipment, thousands of dollars are often wasted annually in stripping, inspecting and then reinsulating this equipment. Often, various methods of ultrasonic inspection require the expensive removal and replacement of large sections of pipe jacketing and insulation. Even when only small holes are made, the exposed test points can easily end up as ragged, dangerous eyesores which allow substantial temperature loss. Further, moisture can enter at these points and wet the insulation and cause external pipe corrosion.

II. Description of the Prior Art:

Various types of demountable insulating plug configurations have been tried, however, none are presently available which provide all of the advantages of the present invention. Some of those various prior art devices are as follows:

U.S. Pat. No. 3,658,096 issued to Higuera discloses a plug formed of a "biscuit" of selected insulating material in desired shape secured to one flat surface of a cap which has substantially larger dimensions, the plug includes a handle which is integrally formed to certain locking tabs, each end of said handle extending through the cap and/or withdrawn when the handle is pulled and reinserted into the appropriate location when the handle is pushed U.S. Pat. No. 3,827,462 issued to Celesta, discloses a plug which comprises a member for insertion into the hole, a cap integrally constructed with the member, a groove which extends across the cap, and a spring means which has a length greater than that of the groove and which can be placed into the groove when the plug is being utilized so as to engage the insulation with the two ends of the spring in order to retain the plug in the whole.

U.S. Pat. No. 4,091,842 issued to Greenawalt et al., discloses a resealable sealing assembly which utilizes a cylindrically shaped hollow plug with a concavely curved angular lip at the top of said plug which plug also has an angular cleat protruding outwardly from the side, and a hollowed sleeve which surrounds the plug which maintains contact with the insulation material and is bonded thereto.

U.S. Pat. No. 5,010,926 issued to Herman Kurth et al., discloses an insulation access aperture liner which simply serves the same purpose as the sleeve described and disclosed in the Greenawalt patent.

U.S. Pat. No. 5,014,866 issued to Moore, discloses an insulation seal which is essentially a plug and separate sleeve sealing assembly, again similar to that described and claimed in the Greenawalt patent. The sleeve assembly maintains contact with the insulation material and a plug which fits within that sleeve.

Applicants are also aware that substantially flat stoppers such as that which makes up the annular body portion of applicants' invention have been used for a multitude of purposes by the general public. However, applicants do not believe that such an item has been used as described and claimed herein as part of the overall invention overall which is the subject of this application.

SUMMARY OF THE INVENTION

The present invention satisfies all the needs required for an insulated plug to be utilized as described above without the multiplicity of parts needed for the designs described and disclosed in the prior art. The present invention incorporates a single circular body indented diaphragm portion. Two lips, one on the upper outer end and the other also directed outward but approximately half of the way down the indented wall worked together in order to maintain a sealable connection with the external insulation layer and/or insulation covering. The handle is affixed to the upper center portion of the plug in order to allow removal and replacement while insulation is affixed in a circular fashion to the bottom of the plug in order to maintain insulated protection between the piping and natural elements.

This arrangement comprises a compact easily useful, high quality seal and plug for use with ultrasonic and other types of testing and/or measuring equipment. In order to complete the seal, the plug merely needs to be inserted firmly and pushed down until the lower lip is completely below the outer layer of insulation and/or insulation covering. The upper and lower lips will work with each other to provide sufficient tension to maintain the plug in its location. Indeed, the distance between the two lips should be so as to provide the maximum tension. Removal of the plug is usually accomplished by pulling on the handle until the lower lip is freed from its position.

A BRIEF DESCRIPTION OF THE DRAWINGS

DETAILED DESCRIPTION OF THE PREFERRED EMBODIMENT

Figure 11:
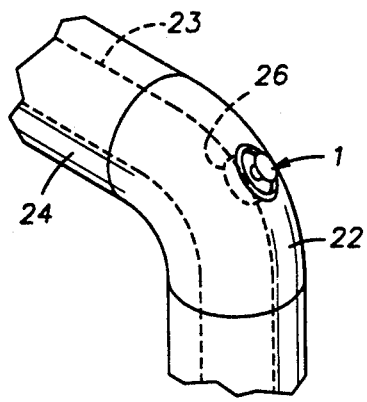
FIG. 11 is a drawing of the present invention in its environment.

Initially referring to FIG. 11, the present invention is shown in its environment. The present invention is identified by 1, it is mounted within an insulated pipe 22. There is shown within item identified as the insulated pipe 22 a pipe 23 for carrying very high or very low temperature fluids, etc. which is protected by an insulating material 24 which surrounds said pipe and has an outer layer or jacketing which is shown in FIG. 11. The insulating material 24 is generally considered to have properties commensurate with the particular use of the pipe 23. Consequently, the insulating material 24 may be any of the various refractory materials such as magnesium carbonate, fire brick, etc., or any of the various glass fiber insulations, spun glass, etc., either wrapped around the pipe 23 or held by a covering material such as a thin layer of metal or canvas suitable for maintaining therein the insulation material.

The piping depicted in FIG. 11 at 23 may be adapted to handle extremely low temperatures in the cryogenic range, or very hot temperatures of the order of, for example, 1,400 degrees fahrenheit. The piping 23 may accordingly be formed of various metals, alloys thereof, ceramics, etc., capable of withstanding these extreme temperatures. An aperture 26 is formed by removing a plug of the insulating material 24 and though may be of any desired shape, is generally circular. A removable insulating plug of the present invention 1 is shown installed within the aperture 26.

Figure 1:
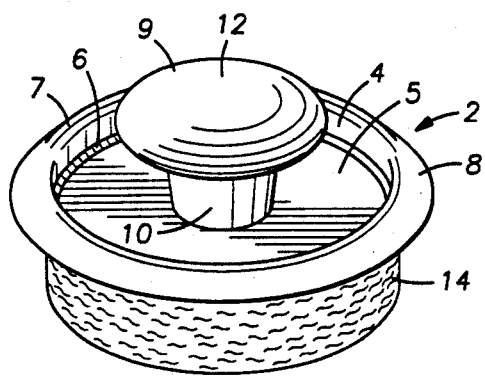
FIG. 1 is an upper perspective view of the present invention.

Referring to the drawings, FIG. 1 discloses a perspective view of the present invention. FIG. 1 shows a circular annular body portion 2 which has an indented diaphragm portion 3 Extending upwardly from said diaphragm portion is annular wall 4. In the preferred embodiment, annular wall 4 is integrally affixed to diaphragm portion 3 by virtue of angled reinforced intermediate area 6. Integrally attached at the top of annular wall 4 and angled outwardly and downwardly therefrom is upper annular lip 8. The upper annular lip operates both as an integral portion of the sealing system of the present invention as well as a protective hood which rests over the narrow annular space which will exist between the plug and confronting surface of the hole in which the plug is placed.

Figure 2:
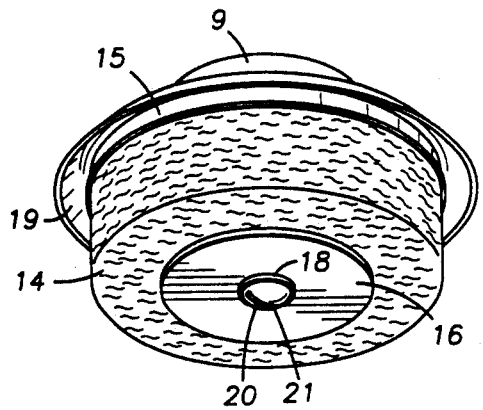
FIG. 2 is a lower perspective view of the present invention.
Figure 6:
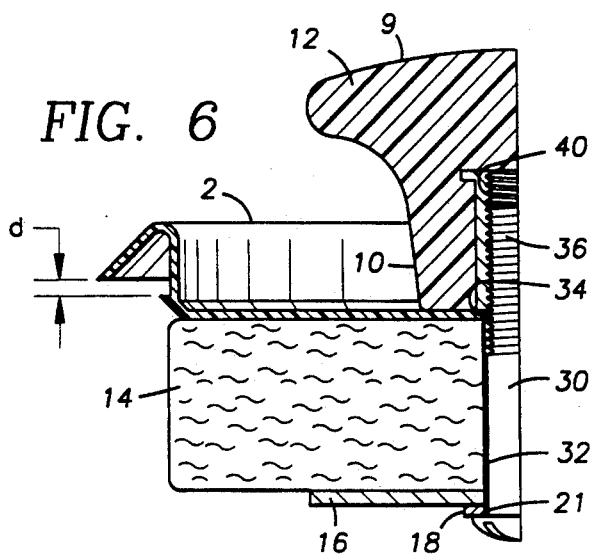
FIG. 6 is a cutaway view of the present invention.

Affixed underneath annular body 2 is insulation plug 14. The insulation material which makes up insulation plug 14 should generally be compatible with the insulation material removed from aperture 26 of figure 11. The insulation plug 14 can be but does not necessarily need to be comprised of the same insulating material plug removed from aperture 26. The plug is then affixed to the bottom annular body 2 and the present invention by virtue of a bolt 20 and washers 18 and 16 as shown in FIG. 2. The bolt 20 contains bolt body 30 which passes through aperture 32 of the insulating plug 14 as well as aperture 34 of annular body 2. (FIG. 6). Also in FIG. 6 it is shown how bolt threads 36 interact with the annular bolt receptacle 40 of handle 9. The handle 9 is utilized to remove and replace sealing plug 1.

Referring back to FIG. 1, it can be seen that handle 9 contains an enlarged upper end section 12 for grasping and a substantially cylindrical neck section 10. The annular cavity 40 is maintained substantially within the neck section 10 and substantially in the center thereof.

Referring to FIG. 6, mounting is accomplished as initially discussed above by placing bolt 20 through insulation aperture 32 and seal body aperture 34 and engaging bolt receptacle 40 within handle 9. Bolt 20 must be of the approximate length so that when bolt threads 36 are substantially threaded within thread receptacle 40 of handle 9, the bolt head 21 is substantially in engagement with insulating material 14. In the preferred embodiment of the present invention, washers 18 and 16 are placed between bolt head 21 and insulating plug 14 so as to provide a substantially wider base upon which insulating material 14 may rest when mounting has been completed. The use of one washer such as 16 may be just as, or more, desirable. Of course, mounting of insulation plug 14 can be accomplished in other ways by glue, bolts, pins, or other means well known in the art.

Figure 3:
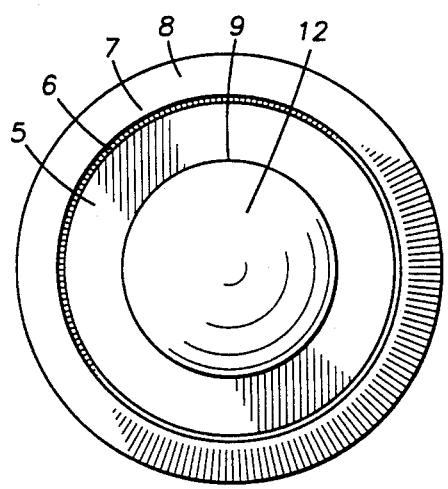
FIG. 3 is a top view of the present invention.

Extending in an oblique angle downwardly and outwardly from the upper portion of annular wall 4, is upper lip member 8. FIG. 2 discloses the underside 19 of lip 8. The upper view of FIG. 3 discloses the enlarged portion 12 of knob 9 as well as the diaphragm portion 3 of annular seal body 2. Still further, the annular upper lip 8 is disclosed as the outermost ring in FIG. 3.

Figure 4:
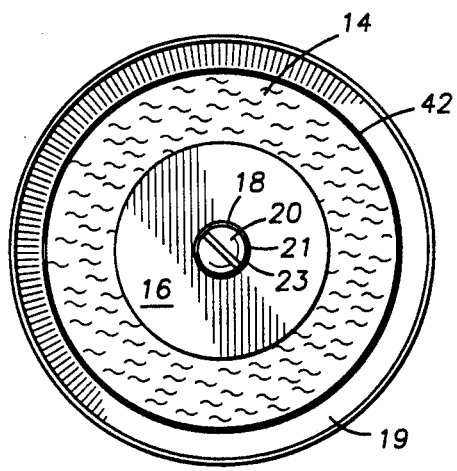
FIG. 4 is a bottom view of the present invention.

FIG. 4 discloses the underside of the insulating plug 1 of the present invention, including bolt head 21 with integrally incorporated screw head slot 23. Directly inside of bolt head 21 can be found washers 18 and 16 which support insulation plug 14. Also disclosed in FIG. 4 is lower annular lip 42.

Figure 5:
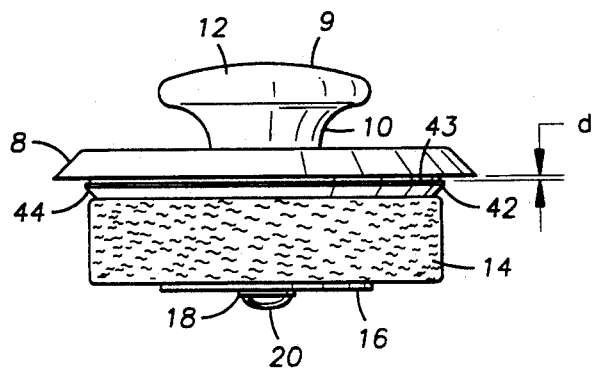
FIG. 5 is a side view of the present invention.

As better disclosed in FIG. 5, lower annular lip 42 extends upwardly and outwardly at an oblique angle from the outside bottom portion 44 of annular wall 4. The outermost radius 43 of annular lower lip 42 is designed so as to, in conjunction with upper lip 8, maintain the insulating plug 1 within annular aperture 26. The distance between the outermost radius of upper lip 8 and outermost radius of lower lip 42 must be sufficiently narrow enough to allow for the outer surface or jacketing of insulating material 24 to be maintained therebetween, but so that insulating plug 1 is maintained snugly in its location when placed within annular aperture 26.

Other forms of lower lip arrangements are shown in FIGS. 7-10. Upper sealing lip 8 is intended to remain substantially the same for each different embodiment. As noted above, upper ceiling lip 8 extends annularly downward and away from annular wall 4. At 7, upper lip 8 is integrally connected to annular wall 4. The insulation material 14 disposed immediately below diaphragm portion 3 of annular seal body 2 is also disclosed.

Figure 7:
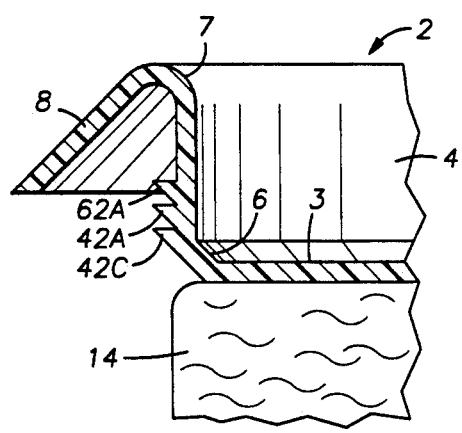
FIG. 7 is a cutaway view of an alternative embodiment of the present invention.
Figure 8:
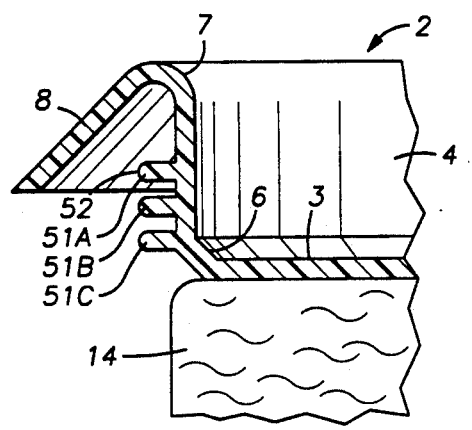
FIG. 8 is a cutaway view of an alternative embodiment of the present invention.
Figure 9:
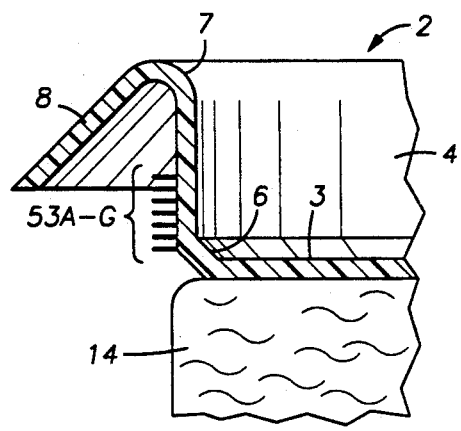
FIG. 9 is a cutaway view of an alternative embodiment of the present invention.
Figure 10:
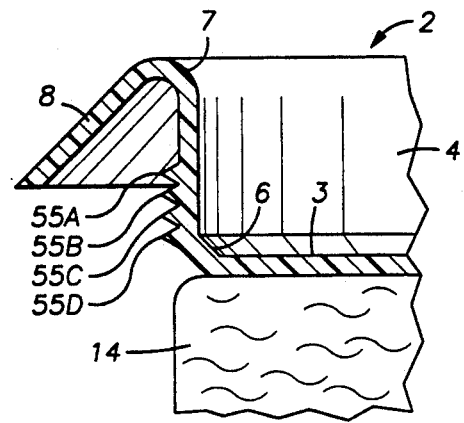
FIG. 10 is a cutaway view of an alternative embodiment of the present invention.

With respect to FIG. 7, the same general design of lower lip 42 is utilized however as disclosed a plurality of such lips or incorporated into design each identified as 42. These multiple lower lips allow for versatility in inserting the present invention into its environmental location as disclosed in FIG. 11 so as to allow for different thicknesses, curvatures, types of insulation material 23 and/or outer surface of such insulation material 24. Still further, this arrangement allows for a safety mechanism such that if the insulating plug 1 is maintained in position by virtue of upper lip 8 and upper lower lip 42a and 42a gives way, lower lips 42b and 42c will prevent total dislodgment of insulating plug 1 from its location. FIGS. 8, 9 and 10 show various alternative extending perpendicularly outwardly from the outside of annular wall 4, each having substantially rounded ends 52. FIG. 9 discloses a different arrangement whereby each lower lip 53a-g also extends perpendicularly outwardly from the annular wall 4, but they are of substantially lesser thickness than those disclosed in FIG. 8, thereby providing more lower lip segments in substantially the same amount of space. FIG. 10 discloses angular lower lips 55a-d which are substantially triangular wherein the base of each triangle is integrally affixed to the outside of annular wall 4.

The annular seal ring body 2 should be made normally out of polymeric non heat conducting material. It must be of substantial heat resistance to avoid any loss of structural integrity in extreme temperatures, but avoid conducting and transferring those temperatures to the operator. As with the seal ring body 2, handle 9 should also be comprised of non heat conducting material and can again be made of a polymeric material or natural material such as wood.

In use, in the situation where the plug 1 is to be inserted into the aperture 26, the plug is grasped by the fingers of one hand and inserted into the aperture until the lower lip 42 is pressed below the surface line of the outer surface of insulation material 24. At that point, upper lip 8 maintained a certain amount of upward tension on the plug 1 while the lower lip 42 will maintain the downward tension. The tension created between these two lips will maintain the plug 1 within aperture 26. To remove plug 1, the operator merely needs to pull the handle with sufficient pressure to withdraw lower lip 42 from underneath the outer layer of insulation material 24. The plug may then be reinserted and removed any number of times as desired. While this invention has been described with specific embodiments thereof, in light of the foregoing description, the many alternatives, modifications, variations will be apparent to those skilled in the art. Accordingly, this patent is intended to embrace all such alternatives modifications and variations as fall within the spirit of the invention and scope of the appended claims.

We claim:

1. A removable insulation plug for plugging and replugging a hole formed in insulating material comprising:

substantially flat circular seal body with upper and lower sides;
   handle means to allow hand grasping of said plug affixed to said upper side of said seal body;
   insulation affixed to said lower side of said seal body;
   vertical annular wall with inside and outside surfaces extending perpendicularly upward from and integrally attached to said body;
   first annular lip at the uppermost point of said wall, said lip extending angularly downward and outward from and integrally attached to said wall; and
   second annular lip disposed on said outside surface of said wall extending horizontally outward from and integrally attached thereto, said second lip being disposed below but sufficiently close to said first lip so as to allow a firm seal to be maintained when said plug is in place.

2. The first annular lip of claim 1 wherein said lip extends outwardly and downwardly from said wall such that when said plug is being used for plugging a hole formed in insulating material, the upper lip will remain above and in contact with said insulating material and further will push downward against said insulating material.

3. The invention of claim 1 wherein support material is integrally affixed to and located immediately below said second annular lip so as to provide strength to said second lip so as to counteract tension created by said upper lip.

4. The invention of claim 3 wherein said support material below said second annular lip is tapered inwardly.

5. The invention of claim 1 wherein said handle means comprises a single knob fixedly attached to the upper side of said circular body.

6. A removable insulation plug for plugging and replugging a hole formed in insulating material comprising:

substantially flat circular seal body with upper and lower sides;
   handle means to allow hand grasping of said plug affixed to said upper side of said seal body;
   insulation affixed to said lower side of said body;
   vertical annular wall with inside and outside surfaces extending perpendicularly upward from and integrally attached to said body;
   first annular lip at the uppermost point of said wall, said lip extending angularly outward from and integrally attached to said wall; and
   plurality of additional annular lips disposed on said outside surface of said wall extending horizontally outward from and integrally attached thereto, said additional annular lips being disposed below, sufficiently close to said first lip and equal distances from each other so as to allow a tight seal to be maintained when said plug is in place.

7. The first annular lip of claim 6 wherein said lip extends outwardly and downwardly from said wall such that when said plug is being used for plugging a hole formed in insulating material, the upper lip will remain above and in contact with said insulating material and further will push downward against said insulating material.

8. The invention of claim 6 wherein support material is integrally affixed to and located immediately below each additional annular lip so as to provide strength to said additional lips so as to counteract the tension created by said upper lip.

9. The invention of claim 8 wherein said support material below said additional annular lips is tapered inwardly.

10. The invention of claim 6 wherein said handle means comprises a single knob fixedly attached to the upper side of said circular body.

11. The invention of claim 6 wherein said additional annular lips are of substantially rectangular shape and protrude perpendicularly outward from said outside surface of said vertical annular wall.

12. The invention of claim 6 wherein said additional annular lips are substantially triangular in shape with one point of the triangle extending perpendicularly outward and with the base of said triangle being integrally affixed to the outside of said vertical annular wall.

13. A removable plug comprising:
substantially flat circular seal body with upper and lower sides;
handle means to allow hand grasping of said plug affixed to said upper side of said seal body;
vertical annular wall with inside and outside surfaces extending perpendicularly upward from and integrally attached to said body;
first annular lip at the uppermost point of said wall, said lip extending angularly downward and outward from and integrally attached to said wall; and
second annular lip disposed on said outside surface of said wall extending horizontally outward from and integrally attached thereto, said second lip being disposed on said wall at a point above the lower most point of said first annular lip so as to allow a seal to be maintained when said plug is in place.

14. A removable insulation plug for plugging and replugging a hole formed in insulating material comprising:
substantially flat circular seal body with upper and lower sides;
handle means to allow hand grasping of said plug affixed to said upper side of said seal body;
insulation affixed to said lower side of said seal body;
vertical annular wall with inside and outside surfaces extending perpendicularly upward from and integrally attached to said body;
first annular lip at the uppermost point of said wall, said lip extending angularly downward and outward from and integrally attached to said wall; and
second annular lip disposed on said outside surface of said wall extending horizontally outward from and integrally attached thereto, said second lip being disposed on said wall at a point above the lower most point of said first annular lip so as to allow a firm seal to be maintained when said plug is in place.

15. A removable insulation plug for plugging and replugging a hole formed in insulating material comprising:
substantially flat circular seal body with upper and lower sides;
handle means to allow hand grasping of said plug affixed to said upper side of said seal body;
insulation affixed to said lower side of said seal body;
vertical annular wall with inside and outside surfaces extending perpendicularly upward from and integrally attached to said body;
first annular lip at the uppermost point of said wall, said lip extending angularly outward from and integrally attached to said wall; and
plurality of additional annular lips disposed on said outside surface of said wall extending horizontally outward from and integrally attached thereto, said uppermost of said additional annular lips being disposed on said wall at a point above the lowermost point of said first annular lip.

* * * * *